(12) United States Patent  (10) Patent No.: US 9,025,758 B2
Buckner et al.  (45) Date of Patent: May 5, 2015

(54) ELECTRONIC COMMUNICATIONS SYSTEM FOR MULTINODAL EXPERT NETWORKS

(71) Applicants: Zach Buckner, Washington, DC (US); Brian Christie, Washington, DC (US)

(72) Inventors: Zach Buckner, Washington, DC (US); Brian Christie, Washington, DC (US)

( * ) Notice: Subject to any disclaimer, the term of this patent is extended or adjusted under 35 U.S.C. 154(b) by 0 days.

(21) Appl. No.: 14/331,461

(22) Filed: Jul. 15, 2014

(65) Prior Publication Data

US 2015/0036814 A1  Feb. 5, 2015

Related U.S. Application Data

(60) Provisional application No. 61/847,008, filed on Jul. 16, 2013.

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC .......... *H04M 3/5183* (2013.01); *H04M 3/5133* (2013.01); *H04M 3/5166* (2013.01); *H04M 3/5232* (2013.01)

(58) Field of Classification Search
USPC ........................... 379/265.09, 202.01, 201.01
See application file for complete search history.

(56) References Cited

U.S. PATENT DOCUMENTS

2003/0035381 A1* 2/2003 Chen et al. .................... 370/261
2009/0135845 A1* 5/2009 Husain et al. ................. 370/420

* cited by examiner

*Primary Examiner* — Quynh Nguyen

(74) *Attorney, Agent, or Firm* — Michael P. Fortkort, Esq.; Michael P Fortkort PC

(57) ABSTRACT

An electronic communication system enables one or multiple parties to aggregate one or multiple experts under one or multiple brand identities and to make each unique identity publicly or privately accessible to other entities seeking to access individual or aggregated experts on a free or paid basis. This system allows one single operator to effectively power hundreds or thousands of custom branded and independently owned expert networks deployed by different network sponsors.

20 Claims, 7 Drawing Sheets

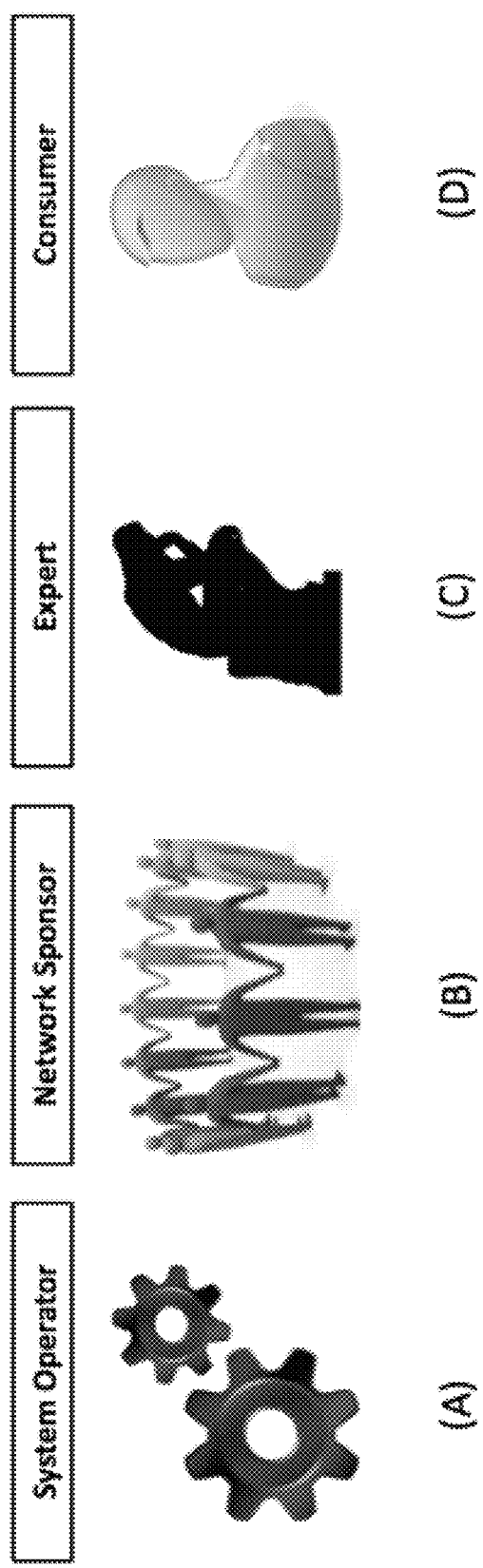

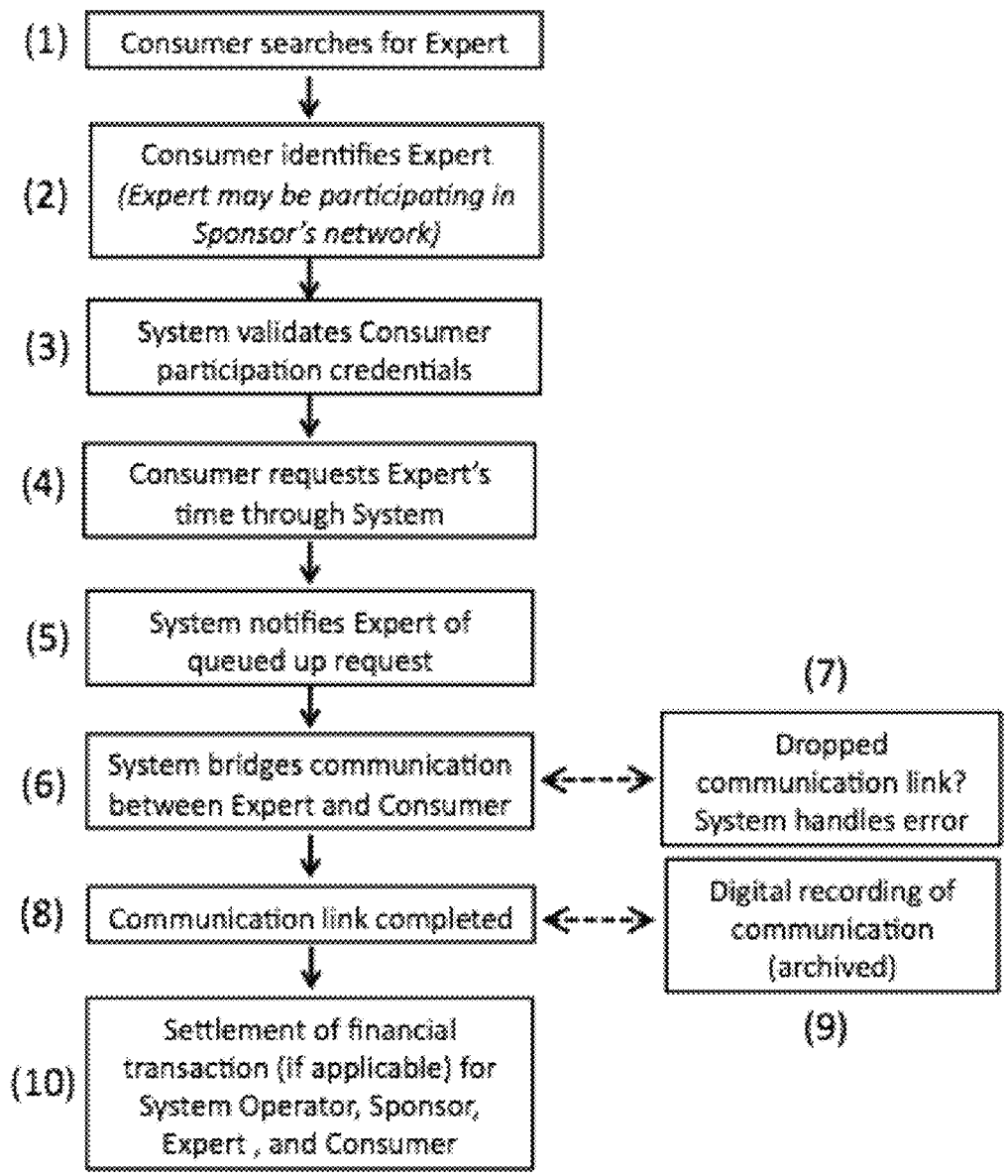

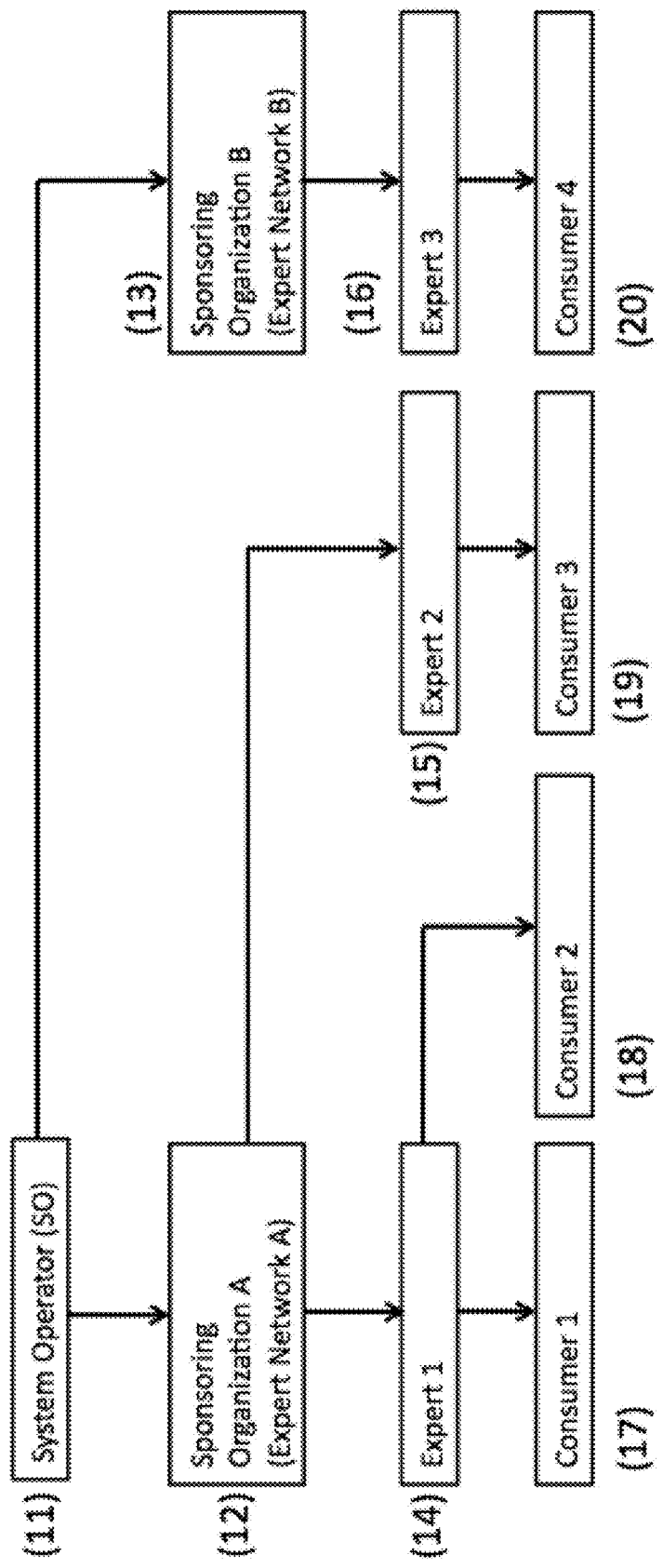
Figure 3 System Overview

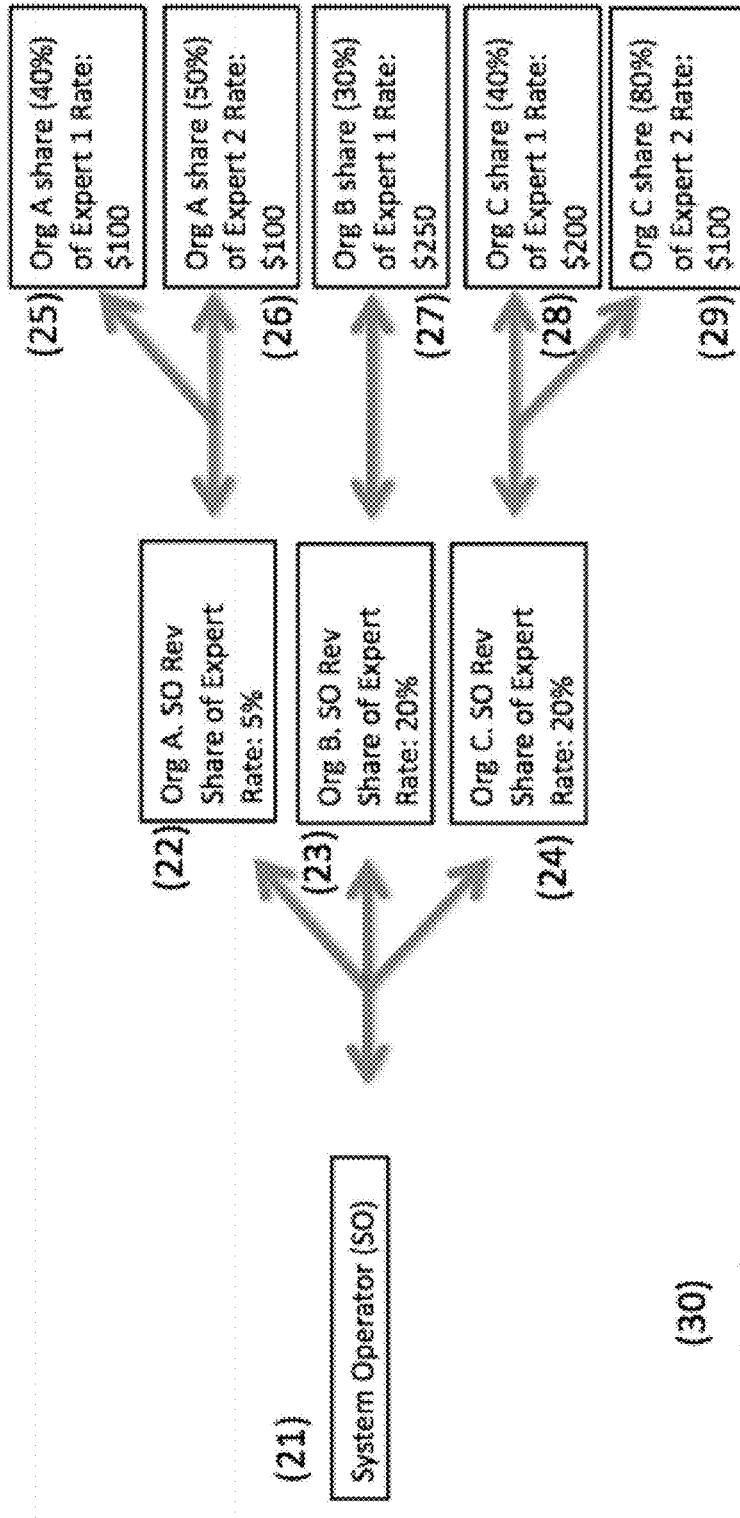
Figure 4 System Intermediated Revenue Model

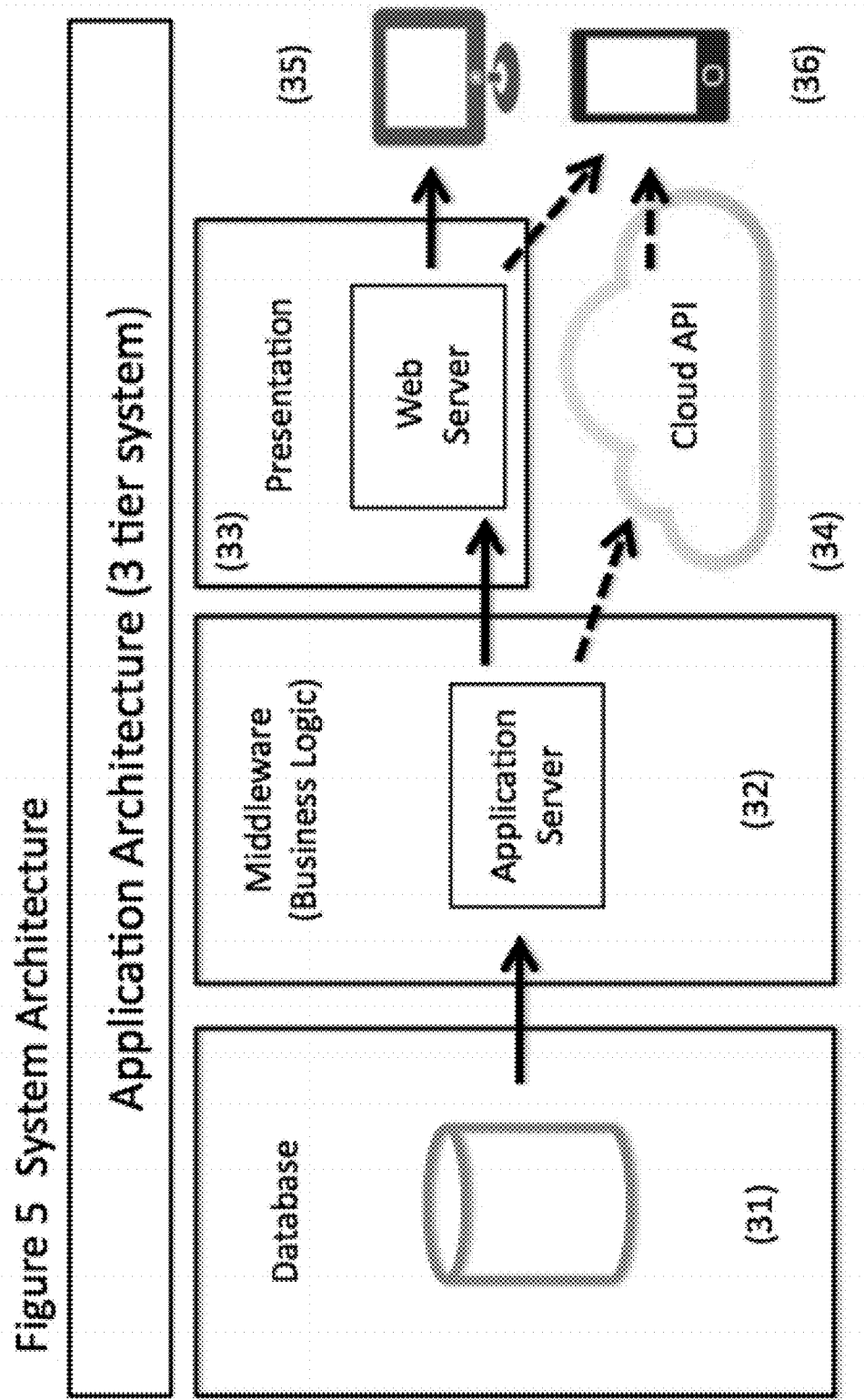

FIGURE 6 – SAMPLE SPONSOR SITE

ECN2  Login Register  Q

(37) ECN
Expert Calling Network

Welcome
In the News
July 11

Featured Experts  (38)

[Photo]  Bryan Krusty
Guru, Fanaticall

This is the length of 140 characters (with spaces) for anything we might do in terms of determining space requirements. The new convention
More Info  Rates
Tags: Tag1, Tag2, Tag3, great lakes Request a Call Expert  BC Comcast
[text]  Test Expert, Fanaticall More Info  Rates
Tags: Expert, 104 mbs, NOVA, BWI Request a Call (39)

[Photo]  AI Expert Sponsor

More Info  Rates
Tags:

On Vacation

[Photo]  Fanaticalltestuser
Lastname

More Info  Rates
Tags:

Request a Call

FIGURE 7 – ADMINISTRATIVE TOOLS

ECN2　　　Home　Expert1 ▽　Directory　[selected expert photo] ▽ Q

ECN
Expert Calling Network

Welcome
In the News
July 11

Call Queue (1)

Review Completed Requests
Are you ready to chat? You must first dial into your ECN Switchboard (888-432-3033) to initiate any of the calls below. Calls will be presented in the order shown.

Call ID　Request Date　　　　　　Name　　　　Description　　　　　　　Fuse Expires
EGDZYHS　7/12/2014 3:18:21 PM　Homer Smith　Call on July 12　5 days from Request Date

[SendQT]　　　　　　　　　　　　　　　　　　　　　　　　　　　　　　[Cancel]

Time　Revenue
15 min　$0.67

ELECTRONIC COMMUNICATIONS SYSTEM FOR MULTINODAL EXPERT NETWORKS

RELATED APPLICATION

This application claims the benefit of U.S. Provisional Patent Application No. 61/847,008 filed on Jul. 16, 2013 with the same title by the same inventors, which provisional application is hereby incorporated by reference herein.

BACKGROUND OF THE INVENTION

The present invention is directed generally to an expert network, and more particularly to an expert network that matches experts with those that need these experts.

Expert networks are emerging as a means for spreading information and helping knowledge seekers find specialized expertise in various fields. Expert networks are usually privately owned closed or limited-access networks aggregating the expertise of numerous individuals on a contract basis. Traditional operators of expert network marketplaces bring experts together into one single unified marketplace, typically often through a manual process or limited automation. Existing expert networks marketplaces lack the ability to transform themselves into taggable entities that can themselves be attributed with characteristics.

The present invention is therefore directed to the problem of developing an expert network with taggable entities that can be attributed with characteristics—thereby enabling the respective marketplaces to be linked together in real time through a system wide operator.

SUMMARY OF THE INVENTION

An Expert Calling Network (ECN) provides a substantial improvement over the traditional means by which an expert network may be organized, monetized, or operated. Each ECN is itself an independent network of experts and consumers but, depending on the preferences of the Network Sponsor, may be linked with other ECNs and therefore serve as a single node on a multi-nodal or meta-network. In one embodiment of the present invention, a software service is provided that enables any qualified individual, organization, institution or other entity to create and populate an ECN, and then to monetize transactions successfully completed through use of the software system. The service provided by the present invention reduces many of the technology and business barriers to entry for entities to rapidly assemble and deploy an expert network.

The present invention provides an electronic communication system to enable one or multiple parties to aggregate one or multiple experts under one or multiple brand identities and to make each unique identity publicly or privately accessible to other entities seeking to access the aggregate experts on a per use or paid basis.

BRIEF DESCRIPTION OF THE DRAWINGS

FIG. 1 indicates participants in a multi-modal expert network according to one aspect of the present invention, in which there may be multiple participants B, C and D corresponding with each participant A.

FIG. 2 depicts a flowchart of a process representing a single instance of a Consumer being connected to an Expert through a system of the present invention according to one aspect of the present invention.

FIG. 3 indicates that each system may power multiple expert network sponsors and each expert network may contain multiple experts of which, each may be accessible to a multiplicity of Consumers according to another aspect of the present invention.

FIG. 4 indicates a revenue model supported by the system that enables variable transaction fees for each Expert, Sponsor, and System Operator according to yet another aspect of the present invention.

FIG. 5 indicates an exemplary embodiment of a system of the present invention having a three-tiered architecture according to yet another aspect of the present invention.

FIG. 6 provides an exemplary embodiment of website for interacting with users, which highlights a directory of experts and which may be implemented by a single site sponsor according to yet another aspect of the present invention.

FIG. 7 provides an exemplary embodiment of an administrative gateway for an expert to audit future and past transactions and to communicate with Consumers prior to a call—as well as perform other administrative functions according to yet another aspect of the present invention.

DETAILED DESCRIPTION

Dozens of organizations operate private expert networks and deploy closed loop systems to facilitate the flow of knowledge from experts to consumers. The present invention provides entities with innovative tools that offer numerous advantages over traditional methods for operating an expert network.

A traditional expert network is managed by a single entity and may use manual or automated processes to bridge communication between users (consumers and experts). The entity operating a traditional expert network acts in isolation and is itself devoid of any tagged or recorded characteristics or properties which would enable it or its users to interact with other expert networks or their users. This creates transaction barriers and knowledge flow barriers as each entity and its users operate on an island without the ability to seamlessly interact with others.

In a multi-nodal Expert Calling Network (ECN) of the present invention, the characteristics of each entity operating an ECN can be tagged and recorded in a database. The configurable preferences of each ECN entity operator and its users can also be tagged and recorded as additional entity characteristics for that particular ECN.

Thus, a multi-nodal Expert Calling Network not only automates the interaction between consumers and experts within each ECN entity, it also creates a multi-nodal meta-network which enables both the ECN entities themselves and their users to be seamlessly integrated with other ECN entities and users based on the preferences set by each individual ECN entity operator or the policies of a system-wide ECN operator.

The invention includes a multi-nodal System A for registering, storing data, and bridging communications for Sponsors B of an Expert Calling Network ("Sponsors" can be organizations or individuals or other entities), the Experts C within their "network," and the Consumers D or seekers of expert knowledge. See FIG. 1.

As seen in FIG. 2, in step 1 a Consumer searches for an Expert that Consumer may find through a Sponsored Network's advertising or other outreach and promotion. In step 2, the Consumer identifies the expert. In step 3, the Consumer completes a qualification process and upon successful completion, in step 4 can reserve the time of an available Expert. In step 5, the System notifies the Expert through various means of the "live" request and in step 6 bridges the Consumer and the Expert. In step 7, if the communication link is dropped, the system handles the error by reestablishing the link or substituting the type of link. In step 8, the communication session is completed, and in step 9 the session is archived with a digital recording of the session for later use. If the communication link is not broken for the duration of the reserved time, then in step 10 the transaction is settled.

FIG. 3 merely illustrates, as examples, that the system can support two—or two thousand organizations wishing to sponsor an Expert Calling Network and that each network may itself contain from one—to one million participating Experts. According to one aspect of the present invention, a single system operator 11 may operate multiple Expert Calling Networks for different sponsoring organizations 12, 13. Each sponsoring organization 12, 13 may have one or more experts 14, 15, 16 available. Each expert may communicate with one or more consumers 17, 18, 19, 20.

FIG. 4 highlights transaction-based-pricing in which the rate at each level can be variable. Pricing may be static or dynamic and be commissions-based which can differ by Expert, by Organization, and at the level of the System Operator 30. Thus, the System Operator 21 may have a 5% share of the expert rate from Organization A (see element 22), whereas the System Operator 21 may have a 20% share of the expert rate from Organization B (see element 23) and the System Operator may also have a 20% share of the expert rate from Organization C (see element 24). The Sponsoring Organization may have a specified share of the expert within its organization. So, for example, Organization A may have a 40% share of the rate ($100) for Expert 1 (see element 25); Organization A may have a 50% share of the rate ($100) for Expert 2 (see element 26); Organization B may have a 30% share of the rate ($250) for Expert 1 (see element 27); Organization C may have a 40% share of the rate ($200) for Expert 1 (see element 28); and Organization C may have a 80% share of the rate ($100) for Expert 2 (see element 29). Thus continuing with these examples (see element 30), for one hour of Expert A1 at the rate of $100, the System Operator 21 earns $5, Organization A earns $40 and Expert A1 earns the remainder—$55. For one hour of Expert A2 at the rate of $100, the System Operator 21 earns $5, Organization A earns $50 and Expert A2 earns the remainder—$45. For one hour of Expert B1 at the rate of $250, the System Operator 21 earns $50, Organization B earns $75 and Expert B1 earns the remainder—$125. For one hour of Expert C1 at the rate of $200, the System Operator 21 earns $40, Organization C earns $80 and Expert C1 earns the remainder—$80. For one hour of Expert C2 at the rate of $100, the System Operator 21 earns $20, Organization C earns $80 and Expert C2 earns the remainder—$0.

FIG. 5 indicates a system with a three-tier architecture including one or more relational or object-oriented databases 31, middleware or business logic and application layer 32, a presentation layer consisting of a web server 33 and/or external APIs (cloud) 34 as well as HTTP compatible devices 35, 36 to access the System.

FIG. 6 represents a Sponsoring organization's communication interface 37 for an Expert Calling Network in the form of a web application accessible via a web browser. The application is both a content delivery system displaying a directory of experts 38 and supporting information as well as an administrative tool 39 for Consumers, Experts, Sponsors, and the System Operator. Each expert has associated with him or her a variety of tags or characteristics that the consumer may view and search for, along with his or her billing rate. These experts may belong to one or more different sponsoring organizations.

FIG. 7 merely shows some administrative features 40 available to an Expert logged into the Sponsor's Expert Calling Network web interface. A call queue shows a review of completed requests, showing: the call identification number, the request date, the name, a description of the event (e.g., a telephone call or multimedia connection), an expiration of the request (i.e., the fuse expiration date), the length of the session and the revenue from the session. The expert may then cancel the completed request or click on a link to accept the request and establish a connection.

Each Sponsor and its Expert may be a unique node in the network designated as an ECN but one skilled in the art will recognize that an Expert could belong to one or many Sponsored ECNs. One skilled in the art will recognize that Experts could "self sponsor" and self provision their participation in a closed or open network or no network and not require a third party ECN Sponsor to make use of the System.

The system tracks authorizations and may track digital rights of the respective Sponsors, Experts, Consumers. System behavior may follow rules set according to the rights management.

Each ECN displays a directory of Experts and each Expert may have associated properties or be assigned specific static or dynamic characteristics. A static characteristic might include historical biographical data about an Expert while a dynamic characteristic of the Expert might include the level of demand within a specified time frame or demand in real time. These characteristics are tagged in the database record for the Expert so they can be searched via these characteristics.

Experts may have self-designated, Sponsor designated, or System designated properties which are stored in the System. The directory data may be visual or be searchable by keyword or other data fields. The System may utilize the characteristics of any individual Expert to advertise the Expert's availability through other third party systems (e.g., The AdWords system of Google®) or itself may advertise or highlight expert availability.

Consumers may have associated properties or characteristics that are captured by and stored in the System. For example, a Consumer TYPE characteristic might indicate the Consumer is a private sector entity, non-profit entity, or government entity. The Consumer LOCATION characteristic might indicate the zip code or census tract in which the Consumer is located. Many other variable and features can be used as tags or characteristics as would be apparent upon review of this.

The System may utilize intelligent matching to connect or recommend relevant parties with matching characteristics or perform other forms of advanced matching.

Experts or Sponsors may set limitations on access to Experts by Consumer characteristics. The System Operator, Sponsors and Experts may set variable pricing depending on Consumer characteristics.

In one example, a natural disaster such as Hurricane Katrina in the Gulf Coast or Hurricane Sandy on the East coast may result in a large number of Experts setting their hourly rate at zero (free) but only when their time or expertise is requested by Consumers with ENTITY characteristics that both indicate the Consumer seeking knowledge is a non-profit or government agency and that the Consumer LOCATION characteristic also indicates the Consumer is located in one of the areas affected by the natural disaster.

The System is able to over-ride the policies and preferences of Sponsoring organizations to rapidly assemble Experts with characteristics matching specific areas of interest. For example, if an act of terrorism were threatened against individuals operating in a specific domain (e.g., a nuclear power plant in the Northeastern region of the United States), the System could rapidly assemble Experts with matching characteristics in relevant knowledge domains (e.g., radiation exposure, nuclear plant operations) and make them available to Consumers seeking such knowledge on an emergency basis. Such use of the System could be accessible to various agencies, branches or departments of government (e.g., Homeland Security, the military, Defense, etc.).

Sponsors may set ECN specific preferences such that their Experts are proprietary and unavailable to Consumers outside the Sponsor's ECN and communication interface to Consumers. Other Sponsors may set their ECN preferences to open their Experts so they are accessible in the Networks of other Sponsors.

The System may enable financial transactions between Sponsors of each node in the network, or each ECN, such that if an Expert belonging to one Sponsor's ECN is accessed through another ECN, a transaction and revenue share arrangement between the ECN Network Sponsors is made possible.

The System may integrate with other third party applications or systems such that Consumers may transact on the System (to request to communicate with an expert) via a click-through on a web browser or via any HTTP enabled device to interact with the system.

The System may create availability for a "grouping" of experts based on Consumer demand or any other criteria such as Expert characteristics. Pricing to bridge such a call may be based on the cumulative cost all the Experts or any other pricing criteria.

The System may offer pre-set groupings of Experts or dynamically aggregate a Grouping of Experts on-the-fly based on requests by the Consumer for specific Expert characteristics.

Consumers that select to communicate with an expert may be pre-authorized to conduct such a transaction or authorized to conduct transactions after submitting valid credit card information or other payment information.

Transactions between Consumers and Experts may be tied to a Consumer credit card, account tied credit, coupons or invoiced upon completion of any transaction. One skilled in the art will recognize that any number of payment and invoicing approaches may be tied to the authorization and settlement of any transaction.

The System may bridge communications between users via asynchronous messaging, email, and/or a live communications session via a telephony connection or video-based service or other communication system.

Experts participating in an ECN may be paid for offering their advice via the ECN. The rate for the Expert may be self determined or may vary based on various demand metrics. For example, if an Expert is in high demand, his/her rate could escalate according to certain rules. Rates and commissions may both be static or variable.

Experts may be reserved for specific time allotments contracted at the time a request is initiated (e.g., 15 min, 60 min, 90 min) or open ended and charged in any time unit interval (e.g., 1 minute). Other time segments may be employed without departing from the present invention.

The System will bridge the Consumer(s) and Expert(s) to prevent the private contact information of each party from being shared with the other party The System may allow Consumer's to rate satisfaction for the Experts and may allow Experts to rate Consumers along any number of criteria.

Various qualification criteria may be used to determine Consumer's ability to participate in the ECN through which they entered the System or any other ECN enabled by the System.

Time-availability of expert can be pre-set or made available via auction mechanism or intelligent agents and can vary in real-time based on dynamic metrics. Scheduling between participants may be integrated with third party tools (e.g., Google® calendars, Apple® ICS, etc.) or coordinated directly by participants or coordinated outside the system via a concierge system.

The system contemplates a "fuse" based system in which bridging of communication is open but completed within a predetermined or definable number of hours or days of the initial request.

The system may utilize any number of automatic notifications via system interfaces—email, text, audio, recorded messages prior to bridging a connection. System may also utilize a queuing system with one-touch advancement to cycle through queue. Calls may also be bridged via manual intervention by a human that bridges two or more parties.

Electronic communications systems are not entirely reliable, therefore, the system may deploy multiple methods for handling dropped communications, prior to end of a designated communication/call, between participants.

For example, if the communication link is between just one Consumer and just one Expert, the system will recognize which party dropped and may respond differently.

If a Consumer drops the communications/call, the Expert may be given prompts to terminate the communications/call or re-initiate the system bridging to the Consumer.

If an Expert drops the communications/call and the Consumer holds the line, then System may work to re-initiate the system to bridge to the Expert. If Expert is not available, communication/call billing may be reset as if the partial communications/call never took place.

If an Expert drops communications link/call and Consumer subsequently drops the communications link/call within a designate time interval, the communication may terminate and the parties are billed/paid appropriately. One skilled in the art will recognize there may be other modes for handling dropped calls.

Communications may be recorded and later approved for storage or delivery.

Settlement of transaction can take place via a credit card, account tied credit, coupon or other means. The System has mechanisms for reporting, administrative tools and tools for account management.

Compensation (fees, commissions, other types) can be variable and distinct to all System participants. In general, the System deploys an intermediated revenue model.

Exemplary Embodiments

According to one aspect of the present invention, an apparatus for matching, bridging and settling a call transaction between one or more tagged consumers with one or more tagged experts includes one or more databases, a server, computer or processor coupled to the databases and software. Each set of consumers and experts exist within a network node or ECN managed by an ECN operator entity. The one or more databases store consumer records, expert records, and ECN entity records. Each of the expert and ECN entity records includes a tag with one or more searchable characteristics in the profile. The databases are accessible via a logical and presentation layer of an HTTP compatible device, such as a mobile phone, computer or the like. The software is stored in the form of non-transitory computer readable media, which has stored thereon instructions causing the processor to establish various logical functions or layers. For example, a business logic layer ensures that only authorized consumers may enter requests that can be matched to searchable characteristics of each expert. The business logic layer may also ensure that the preferences of ECN operator entity are implemented according to instruction and system wide policies. Another business logic layer permits matched participants to schedule or manually initiate a time to be bridged on a telephone call or other connection, such as a video connection or other multimedia connection. An interactive voice response layer and call bridging layer bridges consumers and experts via a telephony connection. Alternatively, a cloud application programming interface layer bridges consumers and experts via a telephony connection. Yet another business logic layer reconnects each party if a call is dropped prior to completion. A user interface layer enables consumers or experts to create a personal profile and tag such profile with one or more searchable characteristics. A user interface layer enables ECN operators to create an ECN entity profile and tag such profile with preferences or searchable characteristics. An application programming interface integration layer tags experts or consumer profiles with characteristics designated by an external application, such as a web-based application. A user interface layer prevents consumer and experts from having direct contact information for each other. An automated billing, settlement, and disbursement layer ensure each party is billed or paid on each transaction. Each of the aforementioned layers can be implemented in software that is stored on a non-transitory computer readable media, which is then executed by a server or other processor.

One possible implementation of the one or more databases includes one or more an SQL servers, each with an application layer that may be implemented on the .NET framework. Call scheduling may not be pre-determined, but instead bridged when initiated by an expert within a pre-determined window of time after which a pending call request shall expire. The telephony connection may be a video connection, a voice connection or multimedia connection. Matching may be conducted by experts and consumers within a single ECN or from a plurality of ECN nodes in the system. The preferences of each individual user, ECN operator, and the policies of the system-wide operator will determine if and when the users from each individual ECN are exposed, in part or in full, to the users of other ECNs.

Another exemplary embodiment of the present invention includes an apparatus for tagging one or multiple ECN operating entities with characteristics including ECN entity preferences, thus enabling matching, bridging and settling of call transactions between tagged consumers and tagged experts included within separate ECN entities.

What is claimed is:

1. An apparatus for matching, bridging and settling a call transaction between one or more tagged consumers with one or more tagged experts comprising:
    one or more databases storing a plurality of consumer records, and a plurality of expert records, wherein each of the plurality of expert records includes a tag having one or more profile searchable characteristics, said one or more databases being accessible via a logical and presentation layer of a hypertext transport protocol compatible device;
    a processor coupled to the one or more databases; and
    a non-transitory computer readable media having stored thereon instructions causing the processor to establish:
    a business logic layer to ensure that only authorized consumers may enter requests that can be matched to said searchable characteristics of each expert;
    a business logic layer to permit matched participants to schedule or manually initiate a time to be bridged on a telephone call;
    an interactive voice response layer and call bridging layer to bridge a consumer and an expert via a telephony connection;
    a business logic layer to reconnect each party if a call is dropped prior to completion;
    a user interface layer to enable consumers or experts to create a personal profile and tag such profile with one or more searchable characteristics;
    an application programming interface integration layer to tag experts or consumer profiles with characteristics designated by an external application;
    a user interface layer to prevent consumer and experts from having direct contact information for each other; and
    an automated billing, settlement, and disbursement layer to ensure each party is billed or paid on each transaction.

2. The apparatus according to claim 1, wherein the database comprises a structured query language server and the application layer is built on a ".NET" framework.

3. The apparatus according to claim 1, wherein call scheduling is not pre-determined but instead bridged when initiated by an expert within a pre-determined window of time after which a pending call request shall expire.

4. The apparatus according to claim 1, wherein the telephony connection comprises a video connection.

5. The apparatus according to claim 1, wherein the telephony connection comprises a voice connection.

6. The apparatus according to claim 1, wherein the telephony connection comprises a multimedia connection.

7. The apparatus according to claim 1, wherein matching is conducted by including experts and consumers from one or more nodes in the system.

8. An apparatus for matching, bridging and settling a call transaction between one or more tagged consumers with one or more tagged experts comprising:
    one or more databases storing a plurality of consumer records, and a plurality of expert records, wherein each of the plurality of expert records includes a tag having one or more profile searchable characteristics, said one or more databases being accessible via a logical and presentation layer of a hypertext transport protocol compatible device;
    a processor coupled to the one or more databases; and
    a non-transitory computer readable media having stored thereon instructions causing the processor to establish:
    a business logic layer to ensure that only authorized consumers may enter requests that can be matched to said searchable characteristics of each expert;
    a business logic layer to permit matched participants to schedule or manually initiate a time to be bridged on a telephone call;
    a cloud application programming interface layer to bridge one or more consumers and one or more experts via a telephony connection;
    a business logic layer to reconnect each party if a call is dropped prior to completion;
    a user interface layer to enable consumers or experts to create a personal profile and tag such profile with one or more searchable characteristics;
    an application programming interface integration layer to tag experts or consumer profiles with characteristics designated by an external application;

a user interface layer to prevent consumer and experts from having direct contact information for each other; and an automated billing, settlement, and disbursement layer to ensure each party is billed or paid on each transaction.

9. The apparatus according to claim 8, further comprising:

an interactive voice response layer and call bridging layer to bridge a consumer and an expert via a telephony connection.

10. The apparatus according to claim 8, wherein the database comprises a structured query language server and the application layer is built on a ".NET" framework.

11. The apparatus according to claim 8, wherein call scheduling is not pre-determined but instead bridged when initiated by an expert within a pre-determined window of time after which a pending call request shall expire.

12. The apparatus according to claim 8, wherein the telephony connection comprises a video connection.

13. The apparatus according to claim 8, wherein the telephony connection comprises a voice connection.

14. The apparatus according to claim 8, wherein the telephony connection comprises a multimedia connection.

15. An apparatus for tagging one or multiple expert calling network operating entities with characteristics including expert calling network entity preferences, thus enabling matching, bridging and settling of call transactions between tagged consumers and tagged experts included within separate expert calling network entities comprising:

one or more databases storing a plurality of expert calling network entity records, a plurality of consumer records, and a plurality of expert records, wherein each of the plurality of expert calling network entity and expert records includes a tag having one or more profile searchable characteristics, said one or more databases being accessible via a logical and presentation layer of a hypertext transport protocol compatible device;

a processor coupled to the one or more databases; and a non-transitory computer readable media having stored thereon instructions causing the processor to establish:

a business logic layer to ensure that only authorized expert calling network entities with matched preferences or characteristics may expose, partially or in full, expert calling network consumers or experts to the consumers or experts of other expert calling network entities;

a business logic layer to ensure that only authorized consumers may enter requests that can be matched to said searchable characteristics of each expert;

a business logic layer to permit matched participants to schedule or manually initiate a time to be bridged on a telephone call;

an interactive voice response layer and call bridging layer to bridge consumers and experts via a telephony connection;

a business logic layer to reconnect each party if a call is dropped prior to completion;

a user interface layer to enable consumers or experts to create a personal profile and tag such profile with one or more searchable characteristics;

an application programming interface integration layer to tag experts or consumer profiles with characteristics designated by an external application;

a user interface layer to enable expert calling network operators to create expert calling network entity preferences;

a user interface layer to prevent consumer and experts from having direct contact information for each other; and an automated billing, settlement, and disbursement layer to ensure each party, including the expert calling network operating entity, is billed or paid on each transaction.

16. The apparatus according to claim 15, further comprising:

a cloud application programming interface layer to bridge consumers and experts via a telephony connection.

17. The apparatus according to claim 15, wherein the database comprises an a structured query language server and the application layer is built on a ".NET" framework.

18. The apparatus according to claim 15, wherein call scheduling is not pre-determined but instead bridged when initiated by an expert within a pre-determined window of time after which a pending call request shall expire.

19. The apparatus according to claim 15, wherein the telephony connection comprises a video connection.

20. The apparatus according to claim 15, wherein the telephony connection comprises a multimedia connection.

* * * * *